United States Patent [19]
Byers

[11] 3,934,482
[45] Jan. 27, 1976

[54] CABLE TRACTION SHEAVE
[75] Inventor: Jimmy F. Byers, Georgetown, Tex.
[73] Assignee: The United States of America as represented by the Secretary of the Navy, Washington, D.C.
[22] Filed: Jan. 27, 1975
[21] Appl. No.: 544,167

[52] U.S. Cl............................... 74/230.7; 254/138
[51] Int. Cl.² ......................................... F16H 55/48
[58] Field of Search............ 254/190 R, 138, 175.7, 254/175.3, 150 R, 191, 192; 74/230.17, 230.7

[56] References Cited
UNITED STATES PATENTS

| | | | |
|---|---|---|---|
| 1,944,426 | 1/1934 | Greening | 74/230.7 |
| 2,017,149 | 10/1935 | Greening | 74/230.7 |
| 2,326,670 | 8/1943 | Patterson, Jr. | 74/230.7 |
| 2,436,381 | 2/1948 | Daman | 74/230.7 |
| 3,635,441 | 1/1972 | Haines | 254/138 |
| 3,836,120 | 9/1974 | Niskin | 254/138 |

Primary Examiner—Robert J. Spar
Assistant Examiner—Kenneth Noland
Attorney, Agent, or Firm—Richard S. Sciascia; Don D. Doty; Harvey A. David

[57] ABSTRACT

A cable traction sheave is described comprising a metal sheave body fixed to a rotatable hydraulic motor housing and having a novel cable groove liner. The liner is formed of a solid elastomeric and has a band of pressure release material that permits deformation of the liner so as to increase lateral pressure on the cable to preserve the round shape thereof and increase gripping of the cable by the liner. An alternative embodiment comprises spring elements embedded in an elastomeric liner and configured to cause the liner to grip the cable in response to cable pressure.

5 Claims, 6 Drawing Figures

CABLE TRACTION SHEAVE

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to cable handling apparatus useful in deploying and retracting towing cables for underwater devices towed from submarines. More particularly, the invention relates to improved cable traction means.

DISCUSSION OF THE PRIOR ART

Towing cables for underwater devices such as sonars, line hydrophones, magnetometers, and the like have been deployed and retracted through a submarine hull by means of power driven winches or capstans, and take-up reels. In may instances, particularly when the submarine is making substantial headway, the cable may be under a tension of several thousand pounds, or more. The traction device must necessarily be capable of exerting sufficient pull to overcome such tension, and this has generally been accomplished by means of a drum driven through reduction gearing, the drum carrying a plurality of turns of the cable to provide driving friction therewith. One example of such a traction device is described in U.S. Pat. No. 3,329,406 to H. J. Flair. Among the disadvantages of such multiple wrap, gear driven cable traction devices are the generation of noise and the increased likelihood of mechanical failure due to the complexity of the gearing, bearings and the like. Moreover, such devices tend to flatten or otherwise distort the cable, leading to early failures in strength members, electrical conductors, and/or sheathing thereof.

The generation of noise is a factor of great concern in the operation of military submarines and results from the use of gears, ball or roller bearings, and the necessary lateral slippage of the cable turns across the face of the drum as the drum turns. Even in non-military applications, such as in personal elevators in buildings, noise is regarded as objectionable and efforts have been made to provide quiet cable traction systems. In doing so, single wrap traction devices, in the nature of a driven, grooved sheave, have been used in which an elastomeric liner or insert is provided in the sheave groove to reduce noise, reduce cable wear, and to increase traction. U.S. Pat. No. 3,279,762 to W. H. Bruns is cited a representative of lined traction sheaves. While the lined traction sheave structures described therein may accomplish significant noise and wear reduction as well as improved traction in comparison to unlined sheaves, there remains room for improvement in all of those catagories.

SUMMARY OF THE INVENTION

The present invention aims to further diminish the generation of noise, degree of cable distortion and wear, and to augment the tractive qualities of cable sheaves through the use of the novel sheave and liner constructions that increase the cable contact and support area and, in the case of driven sheaves, through the use of direct hydraulic motor drive of a hub that is resiliently coupled to the sheave rim.

With the foregoing in mind, it is a principle object of the invention to provide an improved cable traction sheave. Another object of the invention is the provision of a cable traction device that reduces cable machinery noise, reduces cable wear and distortion, and provides improved cable traction for a given amount of cable wrap in a grooved sheave.

Yet another object is to provide a cable sheave comprising an improved groove liner construction that increases cable support area.

Still another object is to provide a cable sheave and liner, of the foregoing character, that comprises means for causing resilient liner material to grip larger areas of the cable surface in response to increased tension in the cable.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
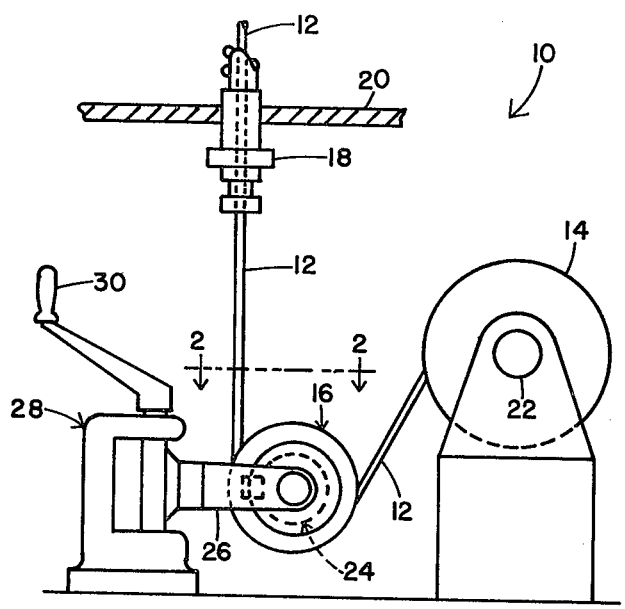
FIG. 1 is a diagrammatic illustration of a submarine tow cable handling system including a cable traction sheave embodying the invention.

In the tow cable system 10 illustrated in FIG. 1, a cable 12 for towing some instrumentation, such as a sonar device, extends from a cable storage or take-up reel 14, through a hydraulically driven traction sheave 16 embodying the invention, and through a suitable hull fitting or gland 18 in the pressure hull 20 of a submarine vessel, for example. Outside of hull 20, cable 12 may be appropriately led through fairleads and flushing and snubbing means to the device to be towed, all as is well understood by those skilled in the art of underwater towing cable deployment. Cable take-up reel 14 is conveniently rotatable by a drive motor 22 of power sufficient to perform the tailing functions of maintaining the cable 12 in wrapped engagement with traction sheave 16, and of accumulating and paying out cable as required for deployment and retrieval.

The principal traction forces are imparted to cable 12 by sheave 16 which is driven by a hydraulic motor 24 supported by arm means 26. Arm means 26 is swingably supported with respect to the hull structure by a cable guide unit 28 including a handle or lever 30 by which the arm means 26, motor 24 and sheave 16 can be steered to effect level winding of cable 12 on take-up reel 14.

Figure 2:
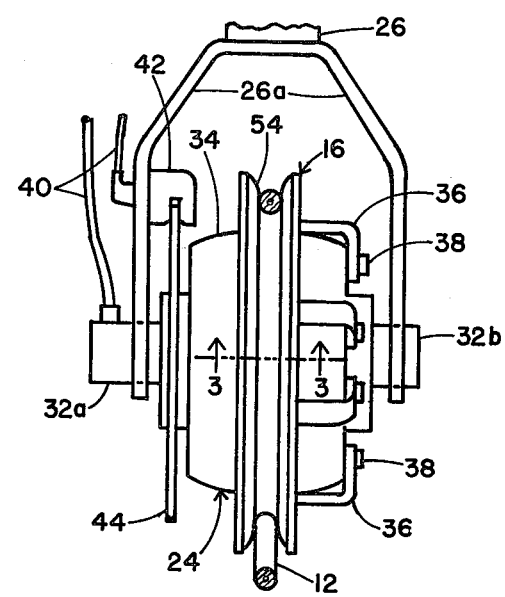
FIG. 2 is an enlarged plan elevational view of the cable traction sheave of the system of FIG. 1.

Referring to FIG. 2, arm means 26 comprises, in this example, a fork 26a that is fixed to opposite end portions 32a and 32b of the central shaft of motor 24. The housing 34 of motor 24 rotates about the shaft thereof, and carries traction sheave 16. The latter is of annular configuration surrounding motor housing 34, and is secured thereto by suitable brackets 36 and screws 38. Hydraulic fluid is fed to and carried from motor 24 via flexible hydraulic lines 40 connected to the motor shaft portion 32a. A hydraulic brake caliper 42 is fixed on fork 26a and is cooperable with a brake disc 44 that rotates with motor housing 34 and sheave 16. This brake means is preferably adapted to operate in a fail-safe mode to halt rotation of sheave 16 in the event of hydraulic power failure to motor 24.

Hydraulic motor 24 may be any of various types, well known in the art, that are capable of variable speed, high torque operation. Examples include rotary vane, gear, and piston types of motors.

Figure 3:
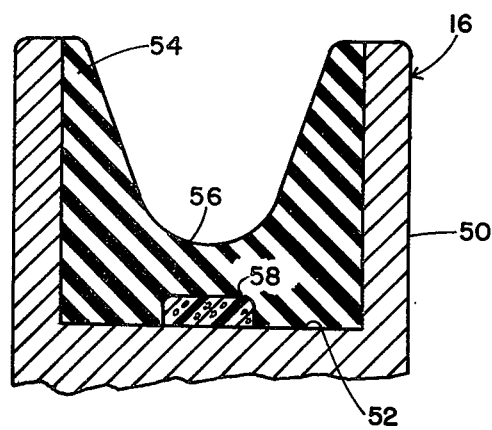
FIG. 3 is a fragmentary sectional view, on an enlarged scale, of a portion of the cable traction sheave of FIG. 2, taken substantially along line 3—3 thereof.

Referring now to FIG. 3, annular sheave 16 is seen to comprise a rigid metal body 50 having a groove 52, formed in the periphery thereof, that is generally rectangular in cross-section. Groove 52 is provided with an annular elastomeric liner 54 formed of rubber, neoprene, or other resilient, solid material capable of elastomeric displacement under pressure. Liner 54 has a generally U-shaped cable receiving groove 56 therein having a bottom curvature of substantially the same radium as the cable 12 that is to ride therein.

An annular band 58 of elastomeric, pressure release material is disposed between the bottom of liner 54 and the bottom surface of groove 52 in sheave body 50. In distinction from liner 54, belt 58 is of a compressible material.

Figure 4:
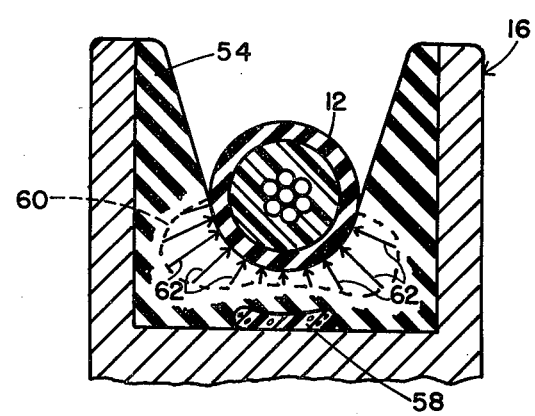
FIG. 4 is a fragmentary sectional view of the cable traction sheave similar to FIG. 3 but taken at a location with the cable seated therein.

Band 58 allows the adjacent portion of liner 54 to deflect in response to cable pressure therein so that the distribution of reactionary pressures by the liner on the cable are such as to provide increased or higher pressures, as shown by the dotted pressure distribution curve 60 in FIG. 4, that acts sideways on the cable and serve to preserve the circular shape of the cable. Vector arrows 62 indicate the relative pressure magnitudes around cable 12.

Moreover, the elastic flow of the liner material from under the cable, results in an increase in liner material around the sides of the cable, thereby actually increasing the area of contact, additionally improving tractive grip between the sheave and the cable.

Figure 5:
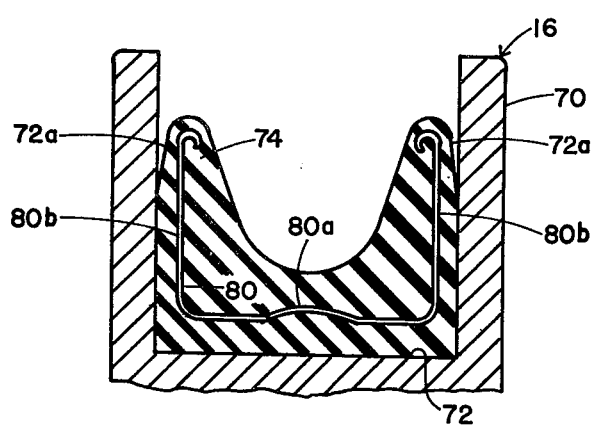
FIG. 5 is a fragmentary sectional view of an alternative sheave construction embodying the invention.
Figure 6:
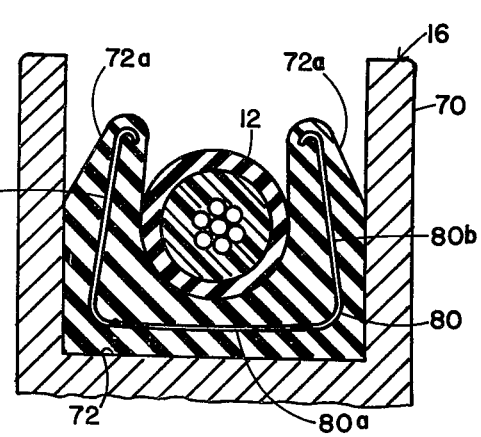
FIG. 6 is a view similar to FIG. 5, but showing the sheave construction with a loaded cable thereon.

Referring now to FIGS. 5 and 6, an alternative embodiment of tractions sheave 16' comprises a body 70 having a rectangular groove 72 in which is disposed a liner 74 formed of an elastomeric rubber of rubberlike material. Liner 74 is cemented or otherwise bonded to the bottom surface 76 of the sheave groove and to a portion of the side walls thereof. For reasons which will presently be made apparent, the peripheral portions 72a of liner 72 are not bonded to the groove side walls. A plurality of spring metal elements 80 are embedded in the elastomeric material of liner 72. Each element 80 comprises an outwardly bowed bottom portion 80a and leg portions 80b extending generally radially of the sheave 16' and within the side portions of the liner.

As is best illustrated in FIG. 6, pressure exerted by the cable 12, under load, flatens the bow portions 80a of elements 80, thereby causing the outer ends of leg portions 80b thereof to move toward one another. This movement causes non-bonded peripheral portions 72a of liner 72 to be pulled inwardly, away from the sheave groove walls, and thereby to increase the area of gripping contact between the liner and the cable. As the cable is led off of sheave 16', the springs 80 and liner 72 return to their FIG. 5 positions.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A cable traction sheave of the character described, said sheave comprising:

a circular sheave body formed of rigid material and having a peripheral groove defined therein of larger cross-sectional area than the cable to be accommodated;

a groove liner comprising a solid elastomeric material bonded in said peripheral groove, said liner having a U-shaped cable receiving groove defined therein;

said liner comprising means, responsive to forces exerted on the bottom portion of said liner by a cable in said cable receiving groove, for causing said liner to increase lateral pressures on said cable;

said means for causing said liner to increase lateral pressures on said cable comprising a plurality of spring elements embedded in said solid elastomeric material, each of said spring elements comprising an outwardly bowed bight portion, disposed in the bottom portion of said liner, and a pair of radially extending leg portions disposed in the side walls of said liner, whereby flattening of said bight portion causes said leg portions to urge said side walls of said liner toward one another and into gripping relation with a cable in said cable receiving groove.

2. A cable traction sheave as defined in claim 1, and further comprising:

motor means including a shaft and a motor housing rotatable anout said shaft;

said circular sheave body being annular and fixed in encircling relation to said housing for rotation therewith.

3. A cable traction sheave as defined in claim 2, and wherein:

said peripheral groove is rectangular in cross-section; and said line has its inner portions bonded to said sheave body and the peripheral portions of said side walls of said liner being free with respect to the side walls of said peripheral groove.

4. A cable traction sheave as defined in claim 1, and wherein:

said peripheral groove is rectangular in cross-section; and said liner has its inner portions bonded to said sheave body and the peripheral portions of said side walls of said liner being free with respect to the side walls of said peripheral groove.

5. A cable traction sheave device, of the character described, comprising:

support arm means, for supporting sheave elements relative to other structure;

motor means including a stator portion, supported by said support arm means, and a rotor portion rotatable with respect to said stator portion;

an annular sheave body, formed of a rigid material, and connected to said rotor portion for rotation therewith, said sheave body being further characterized by a peripheral groove of rectangular cross-section and of greater width than the diameter of a cable to be used with said device;

a liner disposed in said peripheral groove and comprising a solid elastomeric material bonded to said sheave body at least at the inner portions of said peripheral groove;

said liner having a cable receiving, U-shaped groove therein and comprising pressure responsive means for causing said elastomeric material to grip the sides of a cable, when in said cable receiving groove, with a force dependent upon pressure of said cable on the bottom of said receiving groove;

said pressure responsive means comprising a plurality of meal spring elements embedded in said solid elastomeric materials, said elements being distributed along said cable receiving groove therein; and each of said spring elements comprising an outwardly bowed bight portion interconnecting a pair of radially extending leg portions defined in said elastomeric materials so that deformation of said bowed portion will cause said leg portions to move toward one another and so cause said liner to grip said cable.

* * * * *